_United States Patent Office_ 3,222,250
Patented Dec. 7, 1965

3,222,250
INHALATION ANESTHETIC
Harry L. Yale, New Brunswick, N.J., assignor to Olin Mathieson Chemical Corporation, New York, N.Y., a corporation of Virginia
No Drawing. Filed Sept. 10, 1962, Ser. No. 222,632
3 Claims. (Cl. 167—52)

This invention relates to a new anesthetic and more particularly to an inhalation anesthetic composed of a constant boiling mixture of diethyl ether and either bromodifluoromethylchlorofluoromethane, a compound of the formula $BrCF_2CHClF$, or chlorodifluoromethylbromofluoromethane, a compound of the formula $$ClCF_2CHBrF$$

It has been unexpectedly found that bromodifluoromethylchlorofluoromethane and chlorodifluoromethylbromofluoromethane form constant boiling (azeotropic) mixtures with diethyl ether and that such mixtures are effective anesthetics of constant composition and are non-inflammable. This is surprising in view of the fact that closely related halogenated ethanes, such as chlorodifluoromethylbromomethane, do not form azeotropic mixtures with diethyl ether or form azeotropes containing so little ether (i.e., less than 5% ether) so as to act for all purposes as if they were merely the halogenated ethanes alone. Examples of the latter include such closely related compounds as bromodifluoromethyldichloromethane and chlorodifluoromethyldichloromethane. Furthermore, it has been found that the constant boiling mixtures contain approximately 82% by weight of the bromodifluoromethylchlorofluoromethane or chlorodifluoromethylbromofluoromethane and approximately 18% by weight of the diethyl ether, so that the anesthetic effect of both components is achieved. Moreover, it has been found that the mixtures of this invention, unlike diethyl ether itself, are non-inflammable and hence can be used with safety as inhalation anesthetics.

The constant boiling mixtures of this invention can be prepared by the processes of this invention, one of which essentially comprises distilling a mixture of diethyl ether and bromodifluoromethylchlorofluoromethane or chlorodifluoromethylbromofluoromethane and recovering the constant boiling mixture obtained thereby. In this process any proportion of the components may be used but because of their relative cost and to assure maximum yield of the desired azeotrope, an excess of diethyl ether (that is more than 18% by weight) is preferably used. Alternatively, the two components can be simply mixed in the proportions of about 18% by weight of ether to about 82% by weight of bromodifluoromethylchlorofluoromethane, or chlorodifluoromethylbromofluoromethane whereby the desired product is obtained directly. Finally, the two components may be vaporized separately and the vapors so metered as to form the desired azeotrope directly in the gaseous phase.

The following examples illustrate the invention (all temperatures are in centigrade):

EXAMPLE 1

(a) *Preparation of bromodifluoromethylchlorofluoromethane*

A Hastelloy B reactor of 1 l. capacity is charged with chlorotrifluoroethylene and 3 N HBr in glacial acetic acid. The mixture is heated at 115° until reaction is complete and the mixture is distilled. The fraction, B.P. 40–116°, is cooled to 0°, washed with an equal volume of ice-cold water, the organic layer is separated, washed until neutral with 5% aqueous sodium bicarbonate solution, dried and distilled. Careful fractionation gives bromodifluoromethylchlorofluoromethane, B.P. 52.5–52.7°, $n_D^{25}$ 1.3696.

(b) *Preparation of the diethyl ether azeotrope*

When 10 ml. of anhydrous diethyl ether, temperature 26°, and 10 ml. of bromodifluoromethylchlorofluoromethane, temperature 26°, are mixed, the temperature rises rapidly to 34°; the mixture is distilled through a vacuum jacketed glass column (efficiency ca. 8 plates). The first fraction consists of excess diethyl ether, B.P. 36°. The temperature at the top of the column then rises rapidly and the azeotrope distills constantly at 56°. The yield is 20.29 g., $d_{28}^{28}$ 1.500, $n_D^{29}$ 1.3645.

*Analysis.*—Calcd. for 82 wt. percent $BrCF_2CHClF$–18 wt. percent $(C_2H_5)_2O$: Br, 33.60. Found: Br, 33.91.

EXAMPLE 2

(a) *Preparation of chlorodifluoromethylbromofluoromethane*

Bromotrifluoroethylene, B.P. −6°/628 mm., is added to a Hastelloy B autoclave precooled to −78° C., followed by anhydrous hydrogen chloride and a solution of lithium chloride in acetic acid. The autoclave is sealed, and heated, with agitation, at 115° for 24 hours. The autoclave is cooled, the contents removed, washed until neutral with aqueous sodium acetate dried and fractionated to give chlorodifluoromethylbromofluoromethane, B.P. 52.3–52.6°, $n_D^{25}$ 1.3687.

(b) *Preparation of diethyl ether azeotrope*

When 10 ml. of chlorodifluoromethylbromofluoromethane, at 29.5°, and 10 ml. of anhydrous diethyl ether at 30.0°, are mixed, there occurs a spontaneous rise in temperature to 36°. Distillation of the mixture through a vacuum jacketed glass column (efficiency ca. 8 plates) gives just excess diethyl ether, B.P. 36°; following this fraction, there is a sharp rise in temperature at the top of the column to 53°, at which temperature the diethyl ether azeotrope distills constantly. The yield is 20.65 g., $d_{28}^{28}$ 1.48, $n_D^{29}$ 1.3636.

*Analysis.*—Calcd. for 82 wt. percent $ClCF_2CHBrF$–18 wt. percent $(C_2H_5)_2O$: Br, 33.60. Found: Br, 33.64.

For use as an anesthetic the mixtures of this invention are administered by either the well-known open drop method or by the use of any of the many types of inhaler equipment in general use; as for example, the inhaler of Epstein and Macintosh (1956) calibrated to deliver known concentrations of the anesthetic agent. Moreover, as indicated hereinbefore, the two components can be separately metered and combined in the gaseous phase. In use the azeotropes are admixed with a source of oxygen, such as oxygen-nitrogen or oxygen-helium mixtures, or, more commonly, air. Desirably, the anesthetic agent is present in the source of oxygen in a concentration of at least about two percent (vol./vol.).

This invention may be variously otherwise embodied within the scope of the appended claims.

What is claimed is:
1. An inhalation anesthetic composed of a constant boiling mixture of about 18 percent by weight of diethyl ether and about 82 percent by weight of a compound selected from the group consisting of bromodifluoromethylchlorofluoromethane and chlorodifluoromethylbromofluoromethane.

2. An inhalation anesthetic composed of a constant boiling mixture of about 18 percent by weight of diethyl ether and about 82 percent by weight of bromodifluoromethylchlorofluoromethane.

3. An inhalation anesthetic composed of a constant boiling mixture of about 18 percent by weight of diethyl ether and about 82 percent by weight of chlorodifluoromethylbromofluoromethane.

References Cited by the Examiner
UNITED STATES PATENTS
2,930,732   3/1960   Lott _____ 167—52.6

OTHER REFERENCES

Ethane: Chem. Abst., volume 54, page 628(S), 1960.
Shoolery: Chem. Abst., volume 52, page 6930 ©, 1958.

JULIAN S. LEVITT, *Primary Examiner.*

MORRIS O. WOLK, *Examiner.*